United States Patent
Shinnar

(10) Patent No.: US 7,954,321 B2
(45) Date of Patent: Jun. 7, 2011

(54) SOLAR POWER PLANT AND METHOD AND/OR SYSTEM OF STORING ENERGY IN A CONCENTRATED SOLAR POWER PLANT

(75) Inventor: Reuel Shinnar, Great Neck, NY (US)

(73) Assignee: Research Foundation of the City University of New York, New York, NY (US)

( * ) Notice: Subject to any disclaimer, the term of this patent is extended or adjusted under 35 U.S.C. 154(b) by 481 days.

(21) Appl. No.: 12/066,054

(22) PCT Filed: Jul. 27, 2007

(86) PCT No.: PCT/US2007/074646
§ 371 (c)(1),
(2), (4) Date: Mar. 6, 2008

(87) PCT Pub. No.: WO2008/108870
PCT Pub. Date: Sep. 12, 2008

(65) Prior Publication Data
US 2010/0176602 A1    Jul. 15, 2010

Related U.S. Application Data

(60) Provisional application No. 60/905,729, filed on Mar. 8, 2007.

(51) Int. Cl.
*B60K 16/00* (2006.01)
*B60L 8/00* (2006.01)
*F03G 6/00* (2006.01)
*F03G 7/00* (2006.01)

(52) U.S. Cl. .............. 60/641.8; 60/641.12; 60/641.14; 60/641.15; 60/659; 165/902

(58) Field of Classification Search ................ 60/641.8, 60/641.11, 641.12, 641.13, 641.14, 641.15, 60/659; 165/902
See application file for complete search history.

(56) References Cited

U.S. PATENT DOCUMENTS 3,977,197 A * 8/1976 Brantley, Jr. ............... 60/659
(Continued)

FOREIGN PATENT DOCUMENTS

JP          61-261678          11/1986
(Continued)

OTHER PUBLICATIONS

Paper entitled A Road Map to U.S. Decarbonization, by R. Shinnar et al., Science vol. 313, pp. 1243-1244 (Sep. 2006). Paper entitled Solar thermal energy: The forgotten energy source, by R. Shinnar et al., Technology in Society 29, pp. 261-270 (2007).

(Continued)

*Primary Examiner* — Thomas E Denion
*Assistant Examiner* — Christopher Jetton
(74) *Attorney, Agent, or Firm* — Fish & Richardson P.C.

(57) ABSTRACT

A method for storing heat from a solar collector CSTC in Concentrating Solar Power plants and delivering the heat to the power plant PP when needed. The method uses a compressed gas such as carbon dioxide or air as a heat transfer medium in the collectors CSTC and transferring the heat by depositing it on a bed of heat-resistant solids and later, recovering the heat by a second circuit of the same compressed gas. The storage system HSS is designed to allow the heat to be recovered at a high efficiency with practically no reduction in temperature. Unlike liquid heat transfer media, our storage method itself can operate at very high temperatures, up to 3000° F., a capability which can lead to greater efficiency. Due to material constraints and cost considerations in the rest of the system the maximum temperature is presently limited to between 1700° F. and 2000° F. The method can be applied to all current solar collector designs. This Abstract is not intended to define the invention disclosed in the specification, nor intended to limit the scope of the invention in any way.

28 Claims, 2 Drawing Sheets

Concentrated Solar Energy with Heat Storage Capability

U.S. PATENT DOCUMENTS

| | | | | |
|---|---|---|---|---|
| 4,137,898 A | * | 2/1979 | Koizumi et al. | 126/591 |
| 4,172,491 A | * | 10/1979 | Rice | 165/10 |
| 4,192,144 A | * | 3/1980 | Pierce | 60/641.8 |
| 4,222,365 A | * | 9/1980 | Thomson | 126/400 |
| 4,304,219 A | * | 12/1981 | Currie | 126/587 |
| 4,362,149 A | * | 12/1982 | Thomson | 126/400 |
| 4,418,683 A | * | 12/1983 | Friefeld et al. | 126/400 |
| 4,433,673 A | | 2/1984 | Vierling | |
| 5,103,802 A | | 4/1992 | Thomason | |
| 5,269,145 A | * | 12/1993 | Krause et al. | 60/659 |

FOREIGN PATENT DOCUMENTS

| | | |
|---|---|---|
| JP | 2002-031035 | 1/2002 |

OTHER PUBLICATIONS

Paper entitled Executive Summary: Assessment of Parabolic Trough and Power Tower Solar Technology Cost and Performance Forecasts, by Sargent & Lundy LLC Consulting Group, NREL/SR-550-35060 (Oct. 2003).

Paper entitled Toward Cost-Effective Solar Energy Use, by N. Lewis, Science vol. 315, pp. 798-801 (Feb. 2007).

Paper entitled the rise and fall of Luz, by R. Shinnar, Chemtech 23, pp. 50-53 (1993).

Paper entitled Reverse-Flow Operation in Fixed Bed Catalytic Reactors, by Matros et al., Catal. Rev., Sci. Eng. 38, pp. 1-68 (1996).

* cited by examiner

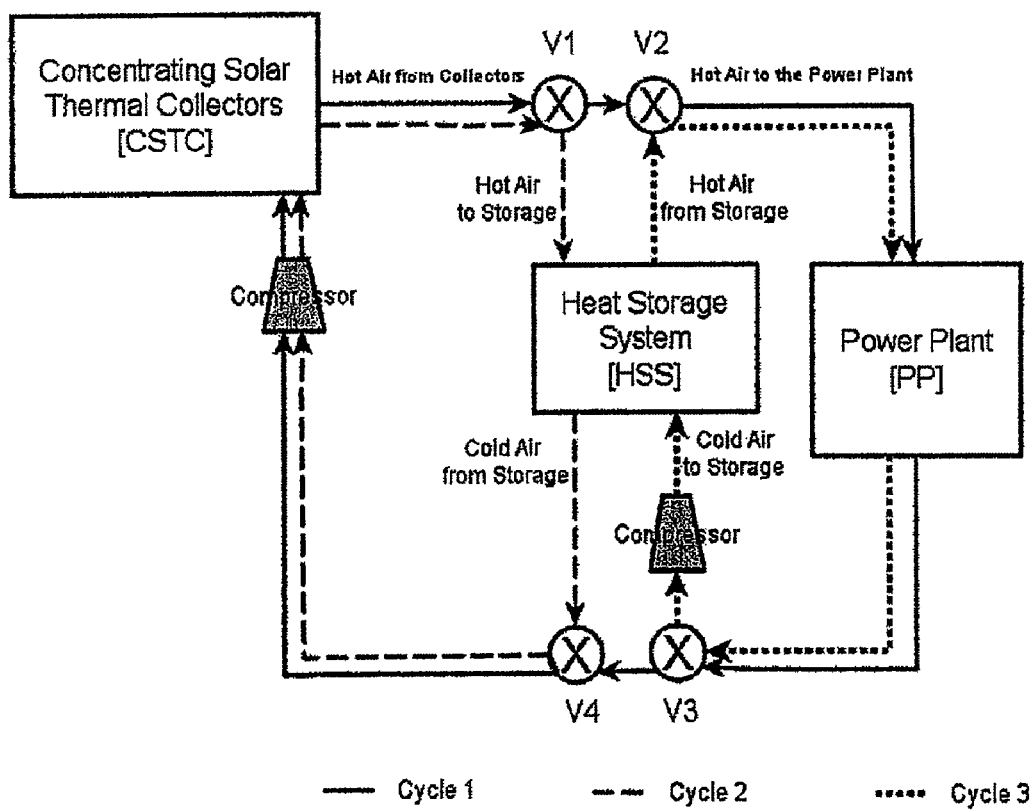
Figure 1: Concentrated Solar Energy with Heat Storage Capability

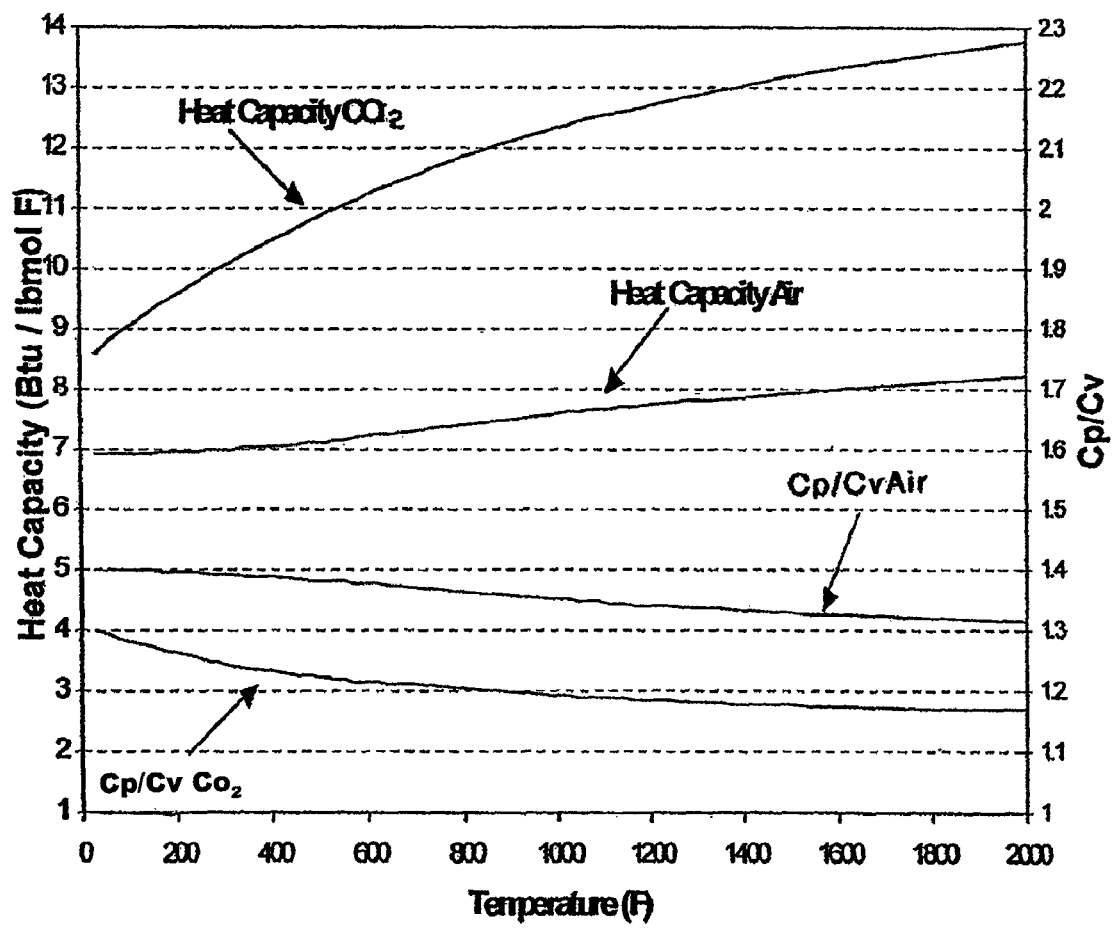
Figure 2. Heat Capacity and $c_p/c_v$ Ratio for Air and $CO_2$

SOLAR POWER PLANT AND METHOD AND/OR SYSTEM OF STORING ENERGY IN A CONCENTRATED SOLAR POWER PLANT

CROSS-REFERENCE TO RELATED APPLICATIONS

The present application is a U.S. National Stage of International Patent Application No. PCT/US2007/074646 filed Jul. 27, 2007, and claims the benefit of U.S. Provisional Patent Application No. 60/905,729, filed on Mar. 8, 2007 under 35 U.S.C. §119(e), the disclosure of which is expressly incorporated by reference herein in its entirety.

BACKGROUND OF THE INVENTION

1. Field of the Invention

The invention relates to a system and method of storing heat in a concentrating solar power plant. The system can use a compressed, preferably non-flammable gas, e.g., air or carbon dioxide ($CO_2$), as the heat transfer medium.

Also, according to the invention, a large number of solar thermal collectors can be arranged in a row and the gas is passed through them at high velocity. As sunshine is not constant but the demand for electricity is ongoing, the solar thermal collectors are large enough to produce the desired total power output per day. During peak periods of sunshine, the heated gas from the solar thermal collectors is passed to the power plant as needed and the cool gas exiting the power plant is recycled through the collector back to the power plant. Any excess hot gas not needed in the power plant is passed through one or more heat storage tanks that are filled with a heat resistant solid filling.

The invention also relates to a heat storage system which can utilize one or more tanks. When solar insolation is insufficient, the hot gas can be supplied to the power plant by a secondary compressed gas cycle in which cool compressed gas is circulated in a reverse direction through the heat storage tanks to the power plant and back again through the heat storage tanks. This allows for efficient heat storage, which is equivalent to storage of electricity, and makes it possible for a solar power plant to be designed for any specific load schedule desired.

2. Discussion of Background Information

A critical advantage of concentrating solar power plants is that they can be provided with energy storage and can, therefore, operate with constant output, despite variations in sunshine during the day. The hot heat transfer fluid is then used to heat a conventional steam power plant and any excess hot heat transfer fluid not needed immediately can be stored as if it were a conventional fuel. However, the available heat transfer fluids for trough collectors are not only expensive, they also limit the thermal efficiency because they do not withstand temperatures above 800° F. Additionally, these fluids are typically also flammable. The solar power plants can be designed to perform like a conventional steam power plant in which the power output can be varied over a large range (see Shinnar, R., Citro, F.; "Solar Thermal Energy: The Forgotten Energy Source", in publication in *Technology in Society* and Shinnar, R., Citro, F.; "A Road Map to U.S. Decarbonization", *Science*, vol. 313, p. 1243, (Sep. 1, 2006)). The disclosures of these documents are hereby expressly incorporated by reference in their entireties. This is possible because heat is usually received by a hot heat transfer fluid flowing through the solar thermal collectors. (see Sargent & Lundy, "*Assessment of Parabolic Trough and Power Tower Solar Technology Cost and Performance Forecasts*", SL-5641, (2002) and Shinnar, R., "*The Rise and Fall of Luz*", ChemTech 23, p. 50-53 (1993). The disclosures of these documents are hereby expressly incorporated by reference in their entireties.

One solution proposed in Sargent & Lundy, "*Assessment of Parabolic Trough and Power Tower Solar Technology Cost and Performance Forecasts*", SL-5641, (2002) is to use a salt with a low melting point. This accommodates higher temperatures (up to 1050° F.) but introduces another severe problem. Molten salts can solidify as they cool at night. As a result, heat tracing is required and operational problems can ensue. The present design of trough collector uses a Dowtherm-like fluid in the collector and molten salts in the storage tank. This limits the maximum temperature to less than 800° F., a severe limitation in thermal efficiency which the invention removes through storage at practically any temperature at which the power plant can operate.

The invention solves one or more of the problems associated with conventional solar power plants; it is simple in design, is more robust, is cheaper and lacks one or more of the disadvantages of conventional solar power plants with storage.

SUMMARY OF THE INVENTION

The invention relates a system and method of storing heat in a concentrating solar power plant. The system uses a compressed (i.e., pressurized), preferably non-flammable gas, e.g., air or $CO_2$ as the heat transfer medium. A large number of solar thermal collectors can be arranged in a row (or train) and the gas is passed through them at high velocity. Increasing the number of solar thermal collectors in the train increases the heat transfer coefficient and lowers the effective temperature difference between the receiver pipe and the heat transfer medium in the last collector of the train, which increases the thermal efficiency of the plant. Pressurizing the gas decreases its volume and thereby the pressure drop through the system—reducing energy losses in the circulation that are essential for efficient storage.

As sunshine is not constant but the demand for electricity is ongoing, the solar thermal collectors must be large enough to produce the desired total power output per day. During peak periods of sunshine, the hot gas from the solar thermal collectors is passed to the power plant as needed and the cool gas exiting the power plant is recycled through the collector back to the power plant. Any excess hot gas not needed in the power plant, however, can be passed through one or more heat storage tanks or vessels that are filled with a heat resistant solid filling.

When the solar insolation is insufficient to provide the energy needs of the power plant, the stored heat can be supplied to the power plant by a secondary compressed gas cycle in which cool compressed gas is circulated in a reverse direction through the heat storage tanks and to the power plant and back again through the heat storage tanks. This allows for efficient heat storage, which is equivalent to the storage of electricity, and makes it possible for a solar power plant to be designed for any specific load schedule desired.

The invention also provides for a process to deliver electricity in a concentrating solar thermal power plant (CSP) that allows high efficiency storage over a wide temperature range from 100° F. up to about 3000° F. using compressed gas in closed circuits as a heat transfer medium. While the design of the storage tank and the potential fillers allow storage temperatures up to 3000° F., the rest of the power plant becomes extremely expensive to operate at such high temperatures. 1700° F. to 2000° F. may be a more cost-effective limit. The process comprises collecting and transferring heat to a compressed gas at a pressure between about 2 atm and about 150 atm using solar collectors, absorbing, with a hot storage system, the heat of the compressed gas utilizing a bed of heat resistant solids, whereby the absorbing allows recovery of the heat at uniform temperature and efficiency over about 95%, transferring the heat of hot compressed gas to a power-generating device, utilizing a closed circuit of piping and compressors in which the hot gas can flow according to need by either first through collectors and directly to the power plant and back to the collectors, or first through the collectors to the storage tank and back to the collectors, and utilizing a second closed circuit of piping and a compressor wherein when heat is needed in the power plant, a compressed gas flows first through the storage system absorbing the heat and then through the power plant transferring the heat back to the storage tank until either no more heat is needed, or the storage tank is cold when the flow is switched to a hot tank.

The pressure may be between 3 and 200 atm, preferably between 10-100 atm and, most preferably 20-50 atm. The compressed gas may be carbon dioxide. The compressed gas may be air. The compressed gas may be a gas or mixture of gases, is preferably inert and/or is preferably with a high specific heat.

The heat storage system may comprise a set of tanks and/or a set of pipes filled with high temperature resistant solids through which hot gas from the solar collectors is passed in one direction heating up the filling and leaving a section of the end cooled such that the gas exits the tank at a low temperature to be recycled to the reactor core leaving a small section cold, and the storage circuit is either switched to another cold tank or stopped. The hot tank may remain hot and function as a storage medium until the heat is needed, whereby, when the heat is needed, a second stream of the same compressed gas is passed in a counter current way to be heated in order to be fed to the power generating device and in a closed circuit is recycled to storage and back to the power generating device until only a small section remains hot, whereby a constant temperature of the hot gas delivered to the power generating device is insured.

The heat storage system may comprise a storage vessel configured such that heat is absorbed in a way that it spreads through the tank in a relatively sharp front, and preferably less wide than one tenth of the length of the vessel. The storage vessel may be similar to the design of a recuperative heat exchanger with the main difference being that in a recuperative heat exchanger the cycles are short and of similar duration and the counter current streams have similar velocities whereas when used for storage, heating occurs whenever heat is available, and the heat recovery, whenever needed to supply the variable load and the counter current streams, may have different or totally different velocities. A circuit of compressed air passing through the collectors may be at a higher pressure, preferably at about 40 to about 100 atm, than in the storage to reduce the energy of recompression, requiring a heat exchanger between the two circuits.

The process may further comprise connecting a larger number of collectors in series and where the fraction of the heated gas can be passed through the storage tank, through a heat exchanger, and transferring the heat to an additional circuit of compressed gas at lower pressure, preferably 10 to 20 atm. The heated gas may thereafter be passed through the storage tanks to transfer the heat to the solid filling. The solid filling may comprise alumina balls of a size that is between about 5 mm and about 20 mm. The solid filling may comprise a high temperature ceramic that preferably has a high heat transfer coefficient and is configured for a low-pressure drop. The storage vessels may comprise steel tanks coated on the inside with one or more heat resistant insulating ceramic layers, and are preferably insulated on the outside and equipped with distributors on both ends in order to thereby ensure fair distribution of the gas. The storage vessels may comprise steel pipes preferably placed horizontally and sufficiently long, and also coated on an inside with a refractory coating and on an outside with an insulation. The storage vessels may have a rectangular cross section and include a temperature resistant coating and/or bricks coated in the inside with a temperature resistant coating. The solar concentrating collectors may comprise parabolic troughs preferably configured for a maximum temperature achievable in a parabolic trough.

The process may further comprise arranging a number of the collectors in a long train and passing the compressed gas sequentially through the train to achieve high velocities and better heat transfer coefficients, whereby the length of the train is limited by an acceptable pressure drop. The collectors may comprise solar towers, which allow a higher temperature to be achieved and therefore a higher thermal efficiency. The collectors may comprise solar dishes. The solar collectors may utilize Fresnel lenses. The solar collectors may comprise a combination of different types of collectors. The primary collectors may comprise at least one of parabolic troughs, collectors built or configured to a temperature below 1200° F., a solar tower, and/or a collector capable of heating the compressed gas to higher temperatures in order to provide hotter gas just for superheating steam or a working fluid of the power plant, whereby the efficiency is improved. The power-generating device may be a steam power plant. The steam power plant may be designed for rapid load following whenever needed. The power-generating device may be capable of meeting a maximum variable expected load even when the load is larger than a rated capacity of the solar power plant, whereby the power plant is able to achieve a large capacity for short times using the stored heat. The solar collectors may be capable of high temperatures and the power-generating device is a gas turbine. The storage may be provided by collecting the heat from the collectors and transferring it to the storage device, and is carried out by a closed circuit of compressed gas, preferably air, and the compressed air is fed to the gas turbine and heated by passing it through the hot storage tanks before being fed to the gas turbine or combined cycle power plant. The temperature of the hot air fed to the turbine may be further increased by adding a small amount of liquid or gaseous fuel. The fuel may comprise a fossil fuel or a fuel obtained using solar electricity. The fuel may comprise ammonia made by the electricity of the solar power plant. The working fluid of the gas turbine may be recycled to the compressor thereby increasing the efficiency of the plant. The working fluid in the gas turbine and the storage circuit may comprise a gas having a higher overall efficiency than air. The process may further comprise generating power with at least one Stirling engine.

The invention also provides for a process for delivering electricity in a concentrating solar thermal power plant (CSP) that allows high efficiency storage over a wide temperature range up to about 3000° F. using compressed gas in closed circuits as a heat transfer medium. The process comprises collecting and transferring heat to a compressed gas at a pressure between about 2 atm and about 150 atm using solar collectors, absorbing, with a hot storage system, the heat of the compressed gas utilizing a bed of heat resistant solids, whereby the absorbing allows recovery of the heat by a compressed gas at uniform temperature and efficiency over about 95%, and transferring the heat of the heated compressed gas to a power-generating device. The process also includes guiding a compressed gas flow through a closed circuit of piping and compressors, wherein the compressed gas flows according to at least one of through the collectors and directly to the power plant and back to the collectors and through the collectors to a storage tank and back to the collectors. The process additionally includes guiding a compressed gas flow through a second closed circuit of piping and a compressor when heat is needed in the power plant and not available from the collectors, whereby a compressed gas flows through the storage system absorbing the heat and then through the power plant transferring the heat to the power plant and then, back to the hot storage tank until either no more heat is needed, or the storage tank is cold when the flow is switched to a hot tank. The pressure may be between about 5 and about 60 atm. The pressure may be between about 10 and about 30 atm. The compressed gas may be carbon dioxide. The compressed gas may be air. The compressed gas may be a gas or mixture of gases, is preferably inert and/or is preferably with a high specific heat.

The heat storage system may comprise a set of tanks and/or a set of pipes filled with high temperature resistant solids through which hot gas from the nuclear reactor is passed in one direction heating up the filling and leaving a section of the end cooled such that the gas exits the tank at a low temperature to be recycled to the reactor core leaving a small section cold, and the storage circuit is either switched to another cold tank or stopped. The hot tank may remain hot and functions as a storage medium until the heat is needed, whereby, when the heat is needed, a second stream of the same compressed gas is passed in a counter current way to be heated in order to be fed to the power generating device and in a closed circuit is recycled to storage and back to the power generating device until only a small section remains hot, whereby a constant temperature of the hot gas delivered to the power generating device is insured.

The heat storage system may comprise a storage vessel configured such that heat is absorbed in a way that it spreads through the tank in a relatively sharp front, and preferably less wide than one tenth of the length of the vessel. The storage vessel may be similar to the design of a recuperative heat exchanger with the main difference being that in a recuperative heat exchanger the cycles are short and of similar duration and the counter current streams have similar velocities whereas when used for storage, heating occurs whenever heat is available, and the heat recovery, whenever needed to supply the variable load and the counter current streams, may have different or totally different velocities.

A circuit of compressed air passing through the collectors may be at higher pressure, preferably at about 40 to about 100 atm, than in the storage to reduce the energy of recompression. The process may further comprise connecting a larger number of collectors in series and where the fraction of the heated gas is passed through the storage tank is passed through a heat exchanger transferring the heat to an additional circuit of compressed gas at lower pressure, and preferably 10 to 20 atm. The heated gas may thereafter be passed through the storage tanks to transfer the heat to the solid filling.

The solid filling may comprise alumina balls of a size that is between about 5 mm and about 20 mm. The solid filling may comprise a high temperature ceramic that preferably has a high heat transfer coefficient and is configured for a low-pressure drop. The storage vessels may comprise steel tanks coated on the inside with one or more heat resistant insulating ceramic layers, and are preferably insulated on the outside and equipped with distributors on both ends in order to thereby ensure fair distribution of the gas. The storage vessels may comprise steel pipes preferably placed horizontally and sufficiently long, and also coated on an inside with a refractory coating and on an outside with an insulation. The storage vessels may have a rectangular cross section and include a temperature resistant coating and/or bricks coated in the inside with a temperature resistant coating. The solar concentrating collectors may comprise parabolic troughs preferably configured for a maximum temperature achievable in a parabolic trough.

The process may further comprise arranging a number of the collectors in a long train and passing the compressed gas sequentially through the train to achieve high velocities and better heat transfer coefficients, whereby the length of the train is limited by an acceptable pressure drop. The collectors may comprise solar towers, which allow a higher temperature to be achieved and therefore a higher thermal efficiency. The collectors may comprise solar dishes. The solar collectors may utilize Fresnel lenses. The solar collectors may comprise a combination of different types of collectors.

The primary collectors may comprise at least one of parabolic troughs, collectors built to a temperature below 1200° F., a solar tower, and a collector capable of heating the compressed gas to higher temperatures in order to provide hotter gas just for superheating steam or a working fluid of the power plant, whereby the efficiency is improved. The power-generating device may be a steam power plant. The steam power plant may be designed for rapid load following whenever needed. The power-generating device may be capable of meeting a maximum variable expected load even when the load is larger than a rated capacity of a gas generator, whereby the power plant is able to achieve a large capacity for short times using the stored heat. The solar collectors may be capable of high temperatures and the power-generating device is a gas turbine. The storage may be provided by collecting the heat from the collectors and transferring it to the storage device, and is carried out by a closed circuit of compressed gas, preferably air, and the compressed air is fed to the gas turbine and heated by passing it through the hot storage tanks before being fed to the gas turbine or combined cycle power plant. The temperature of the hot air fed to the turbine may be further increased by adding a small amount of liquid or gaseous fuel. The fuel may comprise a fossil fuel or a fuel obtain using solar electricity. The fuel may comprise ammonia. The working fluid of the gas turbine may be recycled to the compressor thereby increasing the efficiency of the plant and the storage circuit comprises a gas having a higher overall efficiency than air. The process may further comprise generating power with at least one Stirling engine.

The invention also provides for a system for storing heat in a concentrating solar power plant, wherein the system comprises at least one tank comprising solid media structured and arranged to store heat. The system is structured and arranged to pass a portion of a first fluid through at least one tank, to transfer heat to the solid media, to store the heat in the solid media, and to transfer the heat from the solid media to a second fluid.

The first fluid may comprise a compressed gas. The compressed gas may comprise compressed air. The compressed gas may comprise compressed carbon dioxide. The second fluid may comprise a compressed gas. At least one of the first and second fluids may comprise a compressed gas having a pressure of between 3 and 200 atm. The pressure may be between 10 and 100 atm. The pressure may be between 20 and 50 atm. The first fluid may comprise a compressed gas moving a predetermined velocity. The first fluid may be higher in temperature than the second fluid. The first fluid may pass through at least one device heated by the sun before entering the at least one tank. The second fluid may be used to produce steam in a power plant before entering the at least one tank. The first fluid may comprise a compressed gas passing through at least one device heated by the sun. The second fluid may comprise a compressed gas passing through a power plant generating electrical power. The system may further comprise a control system controlling at least one of: when the first fluid is allowed to pass through the at least one tank and when the second fluid is allowed to pass through the at least one tank. The system may further comprise a control system controlling at least one of: when the first fluid is allowed to pass through the at least one tank, when the first fluid is allowed to bypass the at least one tank, when the second fluid is allowed to pass through the at least one tank, and when the second fluid is allowed to bypass the at least one tank. The solid media may comprise at least one of: alumina; silica; quartz; ceramic; pebbles made of at least one of alumina, silica, quartz, and ceramic; high conductivity and high temperature resistant particles; at least one packed bed of at least one of particles and pebbles; and at least one packed bed of solids. The system may be structured and arranged to move at least one of the first and second fluids through the at least one tank with at least one of uniform flow distribution and minimal pressure drops.

The system may further comprise a solar thermal collector system heating the first fluid before the first fluid enters the at least one tank and a steam power plant receiving the heated fluid from the solar thermal collector system under certain conditions and receiving the second fluid from the at least one tank under certain other conditions. The system may further comprise one or more valves controlling movement of the first and second fluids between the solar thermal collector system, the at least one tank, and the steam power plant and one or more recycle compressors pressurizing the first and second fluids. The first and the second fluids may comprise at least one of at least one gas having a high $C_P$ and a low $C_P/C_V$ ratio, air, and carbon dioxide. The first and second fluids may comprise portions of the same compressed gas flowing in a closed system, wherein the portions have different temperatures when entering the at least one tank. The fluid may comprise a fluid heated by a solar thermal collector system before entering the at least one tank and the second fluid comprises a fluid exiting a power plant before entering the at least one tank. The system may have the following three cycles: a first cycle wherein the first fluid bypasses the at least one tank, flows to a power plant, and returns to a solar thermal collector system, a second cycle wherein at least a portion of the first fluid flows through the at least one tank and returns to the solar thermal collector system, and a third cycle wherein the second fluid passes through the at least one tank, flows to a power plant, and returns to the at least one tank.

The invention also provides for a system for producing electrical energy comprising at least one tank comprising solid media structured and arranged to store heat, a solar thermal collector system heating a first fluid before a first portion of the first fluid enters the at least one tank, and a power plant receiving a second portion of the first fluid from the solar thermal collector system under certain conditions and receiving a second fluid from the at least one tank under certain other conditions. The system is structured and arranged to pass the first fluid through the at least one tank, to transfer heat from the first fluid to the solid media, to store the heat in the solid media, and to transfer the heat from the solid media to the second fluid.

The system may further comprise one or more valves controlling movement of the first and second fluids and portions thereof between the solar thermal collector system, the at least one tank, and the power plant, one or more recycle compressors pressurizing the first and second fluids, and a control system controlling at least one of: fluid flow through the at least one tank, fluid flow that bypasses the at least one tank and pass through the steam power plant, second fluid flow through the at least one tank, and second fluid flow bypassing the at least one tank and entering the solar thermal collector system. The system may have the following three cycles: a first cycle wherein the first fluid bypasses the at least one tank, flows to the power plant, and returns to the solar thermal collector system; a second cycle wherein at least the first portion of the first fluid flows through the at least one tank and returns to the solar thermal collector system; and a third cycle wherein the second fluid passes through the at least one tank, flows to the power plant, and returns to the at least one tank.

The invention also provides for a method of storing heat, wherein the method comprises moving a portion of heated fluid from at least one solar thermal collector to at least one tank comprising solid media structured and arranged to store heat and transferring the stored heat from the solid media to a fluid that can be used by a power plant to generate electrical energy. The heated fluid and the fluid may comprise a compressed gas. The compressed gas may comprise at least one of compressed air and carbon dioxide. The method may further comprise pressurizing at least one of the heated fluid and the fluid to a pressure of between about 3 and about 200 atm.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 schematically shows one non-limiting embodiment of a solar power plant system which utilizes three circuits of pressurized gas to provide the power plant with its thermal energy requirements in order to generate electricity in a substantially continuous manner; and FIG. 2 shows a chart illustrating heat capacity and $C_P/C_V$ Ratio for air and carbon dioxide ($CO_2$) showing the advantage of using $CO_2$ over air. $CO_2$ has a high specific heat ($C_P$), reducing the molar flow rate required and a lower ratio of $C_P/C_V$, decreasing compression energy requirements.

DETAILED DESCRIPTION OF THE INVENTION

FIG. 1 provides a schematic of one non-limiting embodiment of the invention. The system uses an arrangement of concentrating solar thermal collectors CSTC, a heat storage system HSS, and a power plant PP. These devices are coupled to each other with conduit systems, e.g., pipes, which convey compressed gases from the concentrating solar thermal collectors CSTC to the heat storage system HSS and to the power plant PP, from the heat storage system HSS and the power plant PP to the concentrating solar thermal collectors CSTC, from the heat storage system HSS to the power plant PP, and from the power plant PP to the heat storage system HSS. Various valves V1-V4 are utilized to regulate, control, prevent or direct the flow of gasses to each of these devices. The valves V1-V4 can be of any type whether conventional or otherwise.

Instead of a liquid heat transfer medium used in conventional concentrated solar power plant systems, the invention utilizes a compressed gas. The gas can be between 3 and 200 atm, and is preferably between 10 to 100 atm, and most preferably between 20 to 50 atm. It is essential that the gas is compressed to a sufficiently high pressure in order to reduce the pressure drops through the whole system. Atmospheric or low pressure gas causes excessive energy losses due to the pressure drops in the pipes and the packed bed of solids used to store the heat in the heat storage system HSS. Calculations show that at a pressure below 3 atmospheres, the energy consumption of the recycle compressor, due to the high pressure drops, would severely reduce the thermal efficiency of the process, whereas at a pressure of 30 atmospheres, pressure drops are very small. This can be seen in Tables 3a, 3b, and 4a which are described later on. Since up to 40 atmospheres the impact of pressure on investment cost is small, it is preferable that the process be operated close to this limit. Above 40 atm, pressure drops further decrease and the decrease in pressure drops allows for an increase the number of collectors in a single train, thereby simplifying the overall design. However, in many cases, the cost associated with the design of the heat storage tanks of the system HSS might thereby increase, and, in many cases, may not result in a sufficient gain in efficiency and may result in a less simple design. Such any increase in efficiency will be insufficient to pay for the incremental cost associated with using such high-pressure vessels. Of course, exact numbers and the exact choice may depend on the specific case, and the invention therefore contemplates systems which operate at various high pressures in a closed cycle loop.

The compressed gas is passed through the receiver tubes of the solar thermal collectors of the concentrating solar thermal collectors CSTC. The solar thermal collectors can be parabolic troughs, solar towers, dishes, or any other concentrating device. Such devices are known and will therefore not be described in detail. On average, the total output of a solar power plant (cell or thermal) in a unit designed for one-kilowatt peak capacity is 6 kWh per day (2200 kWh per year). This is an approximation varying with location and should be adjusted for a specific location. Since 6 hours per day, distributed over 10 to 12 hours of sunshine, does not correspond to any specific load requirements, this introduces a problem when comparing concentrating solar power to other type of power plants (that are rated based on constant production for 24 hours a day).

In this regard, the invention takes the following approach: one should define a specific load schedule (for example intermediate or base load), and design the system with enough storage and enough collector capacity to give the desired output in a controllable way. Since there is a need for a basis of calculation, the invention defines in each case the total output, and bases the design or configuration using 1 kW average capacity. As a result, the solar thermal collectors of the system CSTC need to be designed large enough to produce the total desired kWh per day (for example 13 kWh/day for intermediate load, 24 kWh/day for base load or any other desired quantity).

The invention contemplates using any compressed, preferably non-flammable gas. However, it is recommended that the gas be either air or $CO_2$. Air has the advantage of being freely available everywhere. $CO_2$ has several advantages. First, as is evident in FIG. 2, the specific heat is about 60% higher than for air, which reduces the volumetric flows, and therefore the pressure drops. Second, the $C_P/C_V$ ratio is lower, which decreases the required compression energy. Another advantage of $CO_2$ is that at higher temperatures it is less corrosive than air. On the other hand, while the cost of $CO_2$ is low, it may not always be available at remote places. Accordingly, the invention contemplates utilizing any gas. Furthermore, although the invention preferably utilizes only non flammable gases, the invention can operate well with any gas, even flammable, or mixture of gases, including flammable gases; provided they have the proper properties and have special advantageous properties (i.e., higher $C_P$, lower $C_P/C_V$ ratio, etc.).

According to one non-limiting embodiment of the invention, although any concentrating solar thermal collector (dish, solar tower or others) will serve equally well, parabolic trough concentrators are used in the system CSTC. The compressed gas is passed successively through a long train of solar thermal collectors arranged in a row to increase linear velocity within the tubes. Due to variations in solar insolation during the day, the flow has to be adjusted constantly to give the desired outlet temperature.

This can be done for each train or combinations of trains by measuring the outlet temperature of the last collection of the train or the total outlet temperature of a combination of trains and adjusting the flow rate by a feed back controller either operating on the valve feeding the compressed gas to the train or by controlling a separate compressor for each train or assembly of collector trains.

In principle, the outlet temperature of the collector should be as high as possible to maximize thermal efficiency and minimize storage costs. However, as in all power plants there are several constraints on the temperature, including materials of construction. Regular steel is limited to 1250° F., stainless and special steels can be used up to 1500° F., and nickel alloys such as Inconel up to 1700 or 1800° F. Above 1850° F., materials that can transfer heat become much more expensive.

The instant invention can be configured with the following constraints. A concentration ratio of the collectors should be taken into account. The maximum feasible temperature can be determined by the concentration ratio of the sunshine on the collector in the design. This mainly applies to a trough configuration, which is limited to 1020° F. because current solar towers can achieve 3000° F., which is far more than can be utilized. The heat transfer medium should also be evaluated. This is the most limiting constraint. The heat transfer fluid used in trough collectors is limited to around 750° F. and molten salt is limited to 1020° F. However, it is difficult to use in trough collectors as it solidifies when the temperature drops at night. On the other hand, it can be used in solar towers as the area to be heat trace is much smaller, but, for solar towers storage temperatures above 1300° F. are highly desirable for increasing efficiency. Our invention is the first storage method to make such temperatures feasible.

While this invention also has constraints, they are much less severe than the first two constraints mentioned above. Vessels and pipes can be insulated and preheated by ceramic coatings. The solid, heat-resistant fillers for the heat storage tanks (discussed later) can be designed for temperatures up to 3000° F. As there is no direct heat transfer, the allowable maximum temperature is not limited by the storage but rather, by material constraints in the other sections. This can allow totally different and more efficient designs increasing the efficiency significantly above present designs.

Higher storage temperatures have two advantages. The thermal efficiency is strongly dependent on the top temperature. Second, the required volume of the storage tank and therefore the cost of storage is an inverse function of the differential between the maximum and minimum temperature of the storage. This gives a large advantage to our storage method for systems that can achieve higher temperatures.

When the gas flow through the solar thermal collectors exceeds the heat requirements of the power plant PP, the excess compressed gas is passed through one or more large heat storage tanks of the system HSS which are filled with a solid medium that is resistant to high temperature. Preferably, the solid medium is one which also has a high heat capacity, e.g., pebbles, made from alumina, silica, quartz, ceramics, or any other type of solid filling or, a specifically designed filling. A suitable filler is for example alumina balls 5, 8 or 10 mm diameter produced by Marke Tech, though there are many suppliers of alumina as well as ceramic fillers with both standard and custom made compositions and shapes. Special geometric shapes can reduce pressure drop, and addition of different materials such as graphite (and certain metal powders if temperature permits) can increase the thermal conductivity.

When the heat stored in the solid medium is used for the production of power, the flow can be reversed and the cold gas, from the power plant(s) PP can be fed to the cold end of the tanks and exits hot, and is then continuously circulated through the hot storage tanks of the system HSS, to the power plant(s) PP and, back to the storage. Because of the excellent heat transfer between the gas and the solid medium, there is practically no energy loss due to heat transfer. Only the pressure drops through the collector pipes and through the hot storage tanks, as well as the heat loss through the walls of the heat storage containers and the piping cause a small loss of energy. These losses can be minimized, however, by proper design—with the result that energy storage can become very efficient thermally.

The total efficiency of storage should be over 90% preferably over 95% and most preferably over 97%. However, as long as the efficiency is over 90%, the storage according to the invention still has a large efficiency advantage over present liquid storage media, despite the fact that the latter has a much lower energy requirement for pumping. Due to the strong temperature restrictions, the overall efficiency is significantly lower (by 10 to 30%) than feasible with compressed gas even for present designs). A big advantage of the invention is therefore that it can store heat instead of a heat transfer fluid and can be designed to operate well at temperatures up to 3000° F. however due to material constraints, the rest of the system limits the temperature to below 2000° F. and in some cases to below 1700.

While the solid filling can vary (e.g., size, quantity, type, etc.), it preferably provides a uniform flow distribution through the media and minimizes pressure drops. Furthermore, the time required to heat or cool a particle or an element of the solid filling should be short compared to the residence time of the compressed gas in the tank(s) preferably smaller by at least a factor of 10 and most preferably, by a factor of 20 or more. Accordingly, solid fillings having a high thermal conductivity (at least 2 W/m° K., preferably larger than 5 W/m° K. and, most preferably larger than 15 W/m° K.) such as alumina, are preferable. A relatively short heating time and a good flow distribution are required to ensure that the heat deposited will progress as a narrow front along the length of the tank(s).

The tank(s) should be sufficiently long that the cool end remains cool at the end of the heat storage cycle. The same would apply when the flow is reversed. The hot end should still stay hot until the end of the heat recovery cycle. The capacity of the heat storage tanks should be sufficient to accommodate the maximum volume of storage needed. Thus, it should cover the case of maximum solar insolation and provide a spare capacity for variation of solar insolation during different days or maybe an extra day or two for bad weather. The maximum total output during the day is still limited by the size of the solar thermal collectors, unless the heat storage is for multiple days.

The concept and design of the heat storage system is a critical part of the invention. It is based on the principle of a recuperative heat exchanger, which has been used for more than eighty years to improve the thermal efficiency of power plants by heat exchanging the hot flue gas with the fresh air fed to the combustor. The same principle was used more recently in the development of cyclic catalytic reactors (Matros, Y. S. H., and Bunimovich, G. A.; "Reverse Flow Operation in Fixed Bed Catalytic Reactors", Catal. Rev.—Sci. Eng., 38 (1), 1-63 (1996). This reference gives detailed instructions for designing the recuperative heat exchanger part of the reactor such that the heat propagates with a narrow front.

For the recuperative heat exchanger and the cyclic catalytic reactor, the cycles are of equal duration and the gas velocities are also equal in both directions. With our invention, after the storage cycle the hot tank is kept warm for longer periods for the purpose of storing heat and no flow occurs during this time. While the heat is recovered, the flows may differ completely from those which occur during the storage period as they are dictated by the needs of the power plant. Thus, while our invention uses the same concept for both heat propagation and recovery as the recuperative heat exchanger and the cyclic catalytic reactor, the heat storage system is a significantly more flexible and novel system. Not only are the vessels larger, but also there is no relation between the flow velocity and cycle times between storage and recovery. As in load following, the velocities would be much higher during recovery than during storage and would vary with time. Also during storage, the sunshine varies and therefore the flow to the storage tank varies while the temperature of the gas going to the collectors is kept constant. All these factors have to be taken into consideration for effective design to assure that the heat is recovered with no temperature loss.

The size of the power plant is determined by the maximum daily load expected, and the maximum output desired for purposes of control. The examples given below, including the choices for the design parameters and the solar insolation, are just realistic illustrative non-limiting examples. The advantage of a concentrating solar power plant utilizing heat storage system HSS is that the solar thermal collectors of system CSTC and the power plant PP can be designed independently to meet a desired control and delivery schedule.

Unlike coal or nuclear power plants, in which the power output is controllable, sunshine cannot be controlled as it varies strongly during the day. Even in the desert, the sun shines for only part of the day. To reliably supply electricity for either base load conditions, intermediate load conditions, or controllable dispatchable energy conditions, solar energy must be stored during the peak daytime hours, and therefore the solar thermal collectors of the system CSTC must be built with a sufficiently large capacity. In power plants designed for intermediate or base load conditions, a significant fraction of the input at peak capacity will always be diverted to heat storage. As a result, the solar thermal collectors of the system CSTC must be designed to be able to operate with a much higher solar insolation than required for the average base or intermediate load. When the sun is shining, any hot gas needed by the power plant PP, e.g., operating with steam, can be delivered to it directly and only the remainder or excess heat will be sent to heat storage in the system HSS. If at any time, such as in early morning, the power plant PP requires more heat than is available from the solar thermal collectors of the system CSTC, the compressed gas heated in the heat storage tanks of the system HSS can be used to supplement the heat from the solar thermal collectors.

As is evident in FIG. 1, the compressed gas can be continuously recycled and moved via three separate interacting pathways, each forming a closed cycle.

Cycle 1 is illustrated with a solid line in FIG. 1 and shows how hot gas exiting the solar thermal collectors of the system CSTC is fed to the power plant PP after passing through valves V1 and V2. The gas is used by the power plant PP to generate electricity and exits the power plant PP cold. The cold gas then passes through valves V3 and V4 and is recycled back to the solar thermal collectors of the system CSTC to be reheated.

Cycle 2 is illustrated with a dashed-line in FIG. 1 and shows how excess hot gas exiting the solar thermal collectors of the system CSTC can be fed to the heat storage tanks of the system HSS using valve V1. The gas transfers or gives up its heat to the solid filling in the tanks. The gas then exits the heat storage tanks cold and it is fed back to the solar thermal collectors of the system CSTC via valve V4 whereupon it is reheated.

Cycle 3 is illustrated with a dotted-line in FIG. 1 and shows how the cold gas exiting the power plant PP is diverted by valve V3 from going back to the solar thermal collectors of the system CSTC to the tanks of the system HSS where it is reheated by passing it in reverse direction through one or more of the heat storage tanks. The hot gas then passes through valve V2 and is fed to the power plant PP and used to produce electricity.

As the total gas holdup or inventory in the system needs to remain constant, the piping of the cycles can be designed in such a way that the gas flow in each of the three cycles can be varied to meet the instantaneous demand of the system. A reasonably sized gas storage tank system is desirable to stabilize the flows under fast varying conditions, but it is, however, not essential.

Even in the desert there are rainy days (about seven a year in California). To allow uninterrupted supply the power plant design should make provision to be able operate with either natural gas or a liquid storable fuel and many existing CSP plants are designed that way. The latter in the long-range future can be prepared from solar electricity via $H_2$ production; converting the $H_2$ either to ammonia or via syngas processes to a liquid fuel (for example methanol or diesel).

The system described herein can be likened to a steam power plant which uses stored heat as a fuel and which stores a supply of heat for at least one day of operation at the design schedule or for whatever period is desired. Preferably the storage capacity should be more than the minimum needed, to provide some spare storage. If one aims to minimize the amount of backup fuel, one should configure the system to provide storage even for several days. To help meet demand over a limited time period, solar power plants can also be designed to supply instantaneously dispatchable electricity with a larger electricity output than the peak capacity of the solar thermal collectors. Steam plants can be designed to meet almost any desired delivery schedule as long as the total output per day does not exceed the total output of the solar thermal collectors, unless the heat storage is for multiple days.

Concentrating solar power plants, however, offer unique advantages over conventional power plants. Their steam power plants can be designed with maximum total capacity and their solar thermal collectors and heat storage tanks can be designed for any desired delivery schedule. Thus, if one desires 100 megawatts of electric power (MWe) intermediate energy, the steam plant power plant PP can be designed for 100 MWe and design the solar thermal collectors of the system CSTC for 13 hours operation can be 1.3 giga-watt-hour (GWh) per day. This is especially important for dispatchable controllable energy conditions, which must be able to handle large, temporary fluctuations over a short term (as will be described in Example 2 below).

The operation of the system shown in FIG. 1 will now be explained. In any single day, the insolation in the morning and late afternoon are low. The power plant PP is started using hot gas which is heated by passing it through the heat storage tanks of the system HSS and the power plant PP is operated at desired capacity (Cycle 3). The cold gas from the power plant PP is thus recycled through a hot heat storage tanks to the power plant PP using valves V3 and V2. When the sun starts to shine, a small amount of the gas exiting the power plant PP is diverted via valve V3 to the solar thermal collectors of the system CSTC and then back to the power plant PP (Cycle 1), but most of the gas is still recycled through the hot heat storage tanks to the power plant PP (Cycle 3). As the sunshine increases, the fraction of recycle gas diverted to the solar thermal collectors of the system CSTC is increased until it reaches the total feed required to maintain the power plant PP at desired capacity. At that time, the Cycle 3 circulation of gas through the heat storage tanks of system HSS is stopped. The circulation through the solar thermal collectors of the system CSTC is increased and the excess amount not needed in the power plant PP is directed through heat storage tanks in the reverse direction (compared to the morning) to store heat (Cycle 2). The velocity of the compressed gas fed to the solar thermal collectors of the system CSTC is controlled so that the gas exiting from the solar thermal collectors is at constant and desired temperature Again as the solar insolation starts to decline, the flows to the heat storage tanks of system HSS are stopped by valve V1 and the power output of the power plant PP is kept constant by using heated gas from the heat storage tanks (Cycle 3). Both the solar thermal collectors of the system CSTC and the heat storage tanks of the system HSS would have to be increased if the plant were to operate for more than 13 hours a day.

Embodiments of the invention will now be described with reference to specific examples. It should be noted, however, that in any design which provides for heat storage for a concentrating solar power plant, one faces a problem. The intensity of the sunshine changes during the day and during the seasons, but the design has to take these changes into consideration. One immediate consequence is that one has to continuously adjust the instantaneous gas flow rate through the solar thermal collectors of the system CSTC to the changing solar flux. This is done by measuring the outlet temperature of the heat transfer medium exiting the last solar thermal collector in the train or, an assembly of trains or collectors, and adjusting the heat transfer medium flow rate to keep the temperature constant which is a standard feedback control problem, well known to those skilled in the art. This design affects not only the size of the heat storage system HSS but also, as concerns the invention, the pressure drops of the gas flow through the system HSS, as well as the heat transfer coefficient in the solar thermal collector pipes of the system CSTC. The examples described below are based on the average solar flux, but they also demonstrated that at maximum solar insolation, the overall pressure drops are acceptable, and at minimum solar insolation, the temperature gradient required, between the receiver pipe and the heat transfer medium in the last solar thermal collector of the train, changes very little. This gradient determines the outlet temperature of the heat transfer medium. Thus, the design has to be able to operate satisfactory over a wide range of solar insolation conditions.

EXAMPLE 1

The first example illustrates a concentrating solar power plant for supplying intermediate load and will be described with reference to Tables 1 to 4. Consider the example of a concentrating solar power plant of 100 MWe rated capacity built in a sunny desert region. The total plant is not dealt with. Instead, only the elements related to heat storage are considered. The results for both air and $CO_2$ as heat transfer medium (see Table 2) are, however, provided. It is further assumed that the power plant PP is designed to deliver 13 hours a day at a guaranteed capacity of 100 MWe (see Table 1). For purposes of control, the steam power plant PP is designed for 150 MWe to allow for fluctuations in demand and the higher output in the summer months. On the other hand, the total daily output is limited by the size of the solar thermal collectors of the system CSTC and heat storage capacity of the system HSS. As in any other storage system, there are design considerations which strongly depend on the purpose of the plant. Thus, if the goal is to combine electricity generation with water desalination or with production of $H_2$, one would store enough heat for 24-hour operation and design the whole plant accordingly. Otherwise, the costs associated with the desalination or $H_2$ plant with partial operation might be too expensive. Furthermore, if one wants to minimize the use of backup fuel for rainy days, one might want to further increase the heat storage. However, the goal here is just to illustrate the system or process. Based on the average sunshine of 6 kWh per kW capacity, seven hours of storage are required for intermediate load, and preferably more.

One can estimate the airflow and the required storage capacity (Table 2). All calculations can be based on a 1 kW capacity plant as the numbers are easier to judge and then multiply by the capacity required. The example also uses a gas pressure of 30 atm and assumes that the power plant PP requires 8500 BTU per hour. Therefore, at peak solar insolation, the air has to absorb 18400 BTU per hour (8500×13/6). We further assume that the trough collectors only deliver 1050° F. and the pressure of the compressed gas is 30 atm. As the utilizable temperature difference between the top temperature of the air and the temperature at which it is recycled is 800° F., this requires 3.2 lbmol/hr flow of compressed air or about 1170 SCF/hr or, at 30 atm and 1050° F., 120 ft$^3$/hr (or 2.0 lbmol/hr of $CO_2$, or 730 SCF/hr, which at 30 atm and 1050° F. is equal to 75 ft$^3$/hr). To get good heat transfer, the velocity inside the solar thermal collector tube(s) should preferably be at least 20 ft/sec. This can be achieved preferably by clustering the appropriate number of solar thermal collectors into one train.

The total amount of energy to be stored is 59500 BTU. Assuming a $C_P$ of 0.25 Btu/lb° F. this gives, at a temperature difference of 800° F., about 300 lb of solids per kW capacity. However, one can add 50% more solid filling to ensure that the cold end section stays cold, the hot end section stays hot, and to handle the higher solar insolation that occurs in summer, for a total of 450 lbs. Using a density of 250 lb/ft$^3$ and 0.4 free space, this gives 3 ft$^3$ of volume, or 300,000 ft$^3$ for 100 MWe and 20500 tons of alumina pellets for the total plant. Since a 300,000 ft$^3$ vessel is too large, one can utilize 45 heat storage vessels, each being 12 foot diameter and 60 foot long.

The costs associated with this example are as follows: 20,500 tons of alumina spheres (for example, those made by Marke Tech, 10 mm diameter grade P965 or P975. There are many other suppliers of different grades and other ceramics that are suitable) at 500-600 dollars a ton would cost about 10-12 million dollars, and the heat storage vessels with all the internals would add (at 100 dollars a cubic foot with internals) another 30 million dollars. Thus, the total cost of the heat storage system HSS should be between 40 to 42 million dollars or $400-420/kW capacity. If much larger heat storage (up to two days) is affordable, this would allow storing energy generated by the solar thermal collectors during the weekends, when less energy is needed and limit the number of days in which a fossil fuel backup in needed. Furthermore, if solar thermal collectors with higher maximum temperatures are chosen, the cost reduction would be inversely proportional to the temperature difference in the heat storage vessels. The volume of heat storage needed is independent of the heat transfer medium used, as it only depends on the amount of heat to be stored, the temperature difference between maximum and minimum temperature in the heat storage tanks, and the properties of the filling.

One main consideration in the design described here relates to minimizing the pressure drops in the total system, which determines the energy consumption of the recycle compressors. This is the main energy loss resulting from energy storage and should be an important consideration in the design. The pressure drops and energy consumption of the instant example (30 atm gas pressure) are given in Table 3a. The energy loss in the design is only half a percent when using $CO_2$, and 1.4% when using air. This is a very important design criterion and, in any final design, one has to weigh the energy loss versus the construction cost. For example, doubling the number of solar thermal collectors in a single train would reduce the cost of piping and distribution, and simplify their design. However, it would also increase the pressure drops in the train of solar thermal collectors. The pressure drops would increase, but still be very low (about 1 atm for $CO_2$ and 1.6 for air). For $CO_2$, the energy loss for compression would be 1.8% versus half a percent for 25 solar thermal collectors in a train. However, the delta-T between the receiver pipe and the heat transfer medium in the last solar thermal collector of the train decreases (Tables 3a and 3b). Here, one can see that it may be advantageous to use $CO_2$ over air, as it allows for operation with double the train size (50 solar thermal collectors for $CO_2$ versus 25 solar thermal collectors for air) at almost equal energy loss (1.8% versus 1.4%), and results in a higher final temperature of the heat transfer medium exiting the last solar thermal collector of the train. One has to consider all of this, in addition to the potential cost savings for a simpler design. Tables 3c and 3d show pressure drops, the required compression energy, and the temperature differential between the receiver pipe and the heat transfer medium in the last solar thermal collector of the train for minimum and maximum solar insolation, respectively.

In Tables 4a and 4b, the expected pressure drops and energy loss for different operating pressures (at 3 and 10 atm), both for $CO_2$ and air, as provided. At 3 atm, the example is carried out using only 10 solar thermal collectors in a train (Table 4a), as with 25 solar thermal collectors in a train, when air is used as the heat transfer medium, the pressure drops are too high and sufficient circulation does not take place. As should be apparent, the operation at sufficiently high pressure is essential for successful design. On the other hand, at 10 atm, a train of 25 solar thermal collectors (Table 4b) can be used. At 3 atm, the required delta-T, between the receiver pipe and the heat transfer medium in the last solar thermal collector of the train, doubles, lowering the outlet temperature and decreasing the thermal efficiency. The energy consumption is also totally unacceptable (44% with air and 16% with $CO_2$). One could lower the energy consumption by reducing the number of solar thermal collectors in the train, but the maximum reachable temperature would significantly decrease unless the circulation and the production rates per collector are reduced. Even in the case of 10 atm, which for $CO_2$ is still acceptable, 10 atm is much less attractive then 30 atm. This clearly illustrates the basic advantage of the invention, i.e., that operating at pressures above 3 atm, and preferably above 20 atm, has a very large unexpected advantage. The upper limit of pressure is determined by the cost of the equipment, especially the storage vessels. The type of vessel discussed here for high temperatures is normally designed for pressures between 20 and 30 atm at least. However, at pressure of up to 50 atm, the cost increases only slightly with pressure. Higher pressures are sometimes justified as they allow longer trains, simplifying the distribution; however, the cost of the heat storage vessels will increase and, unlike chemical reactors, the pressures used in the invention have no impact on the size of the heat storage tanks. Thus, deciding which pressure to use in a design decision. The exact range of pressures available for the design and the number of solar thermal collectors in a train depends, however, on cost considerations specific for each case. And, as stated above, depending on the design, the pressure can be between 3 to 200 atm, preferably between 10 to 100 atm, and most preferably between 20 to 50 atm. It should be noted, however, that the exact pressure strongly depends on size of the overall system and other considerations.

There is a strong relationship between lower gas pressures and increased energy losses due to compression. One can reduce the energy losses by changing the design, but this leads to other problems, and would increase costs. Thus, if one utilizes a smaller number of solar thermal collectors in a train, one is limited by the fact that the heat transfer coefficient decreases and piping costs increase. One can also change the design of the heat storage tanks, making them wider and shorter. However, this not only would increase costs, it would also make it much more difficult to maintain a relatively steep front of the temperature gradient during both heat storage and recovery.

Thus the example described herein provides significant unexpected advantages in using pressurized recycled gas. Of course, this example considers a simplified design configuration. A real-world design, however, would require taking into account detailed cost considerations. The conclusion that for cost effective operation there is a large advantage in using a compressed gas (above 3 atm., preferably above 10 atm., most preferably above 20 atm.) would not change.

EXAMPLE 2

The second example illustrates a concentrating solar power plant to supply to a grid with instantaneously dispatchable electricity in order to compensate for rapid changes in the load. The grid faces large changes in demand during short periods. New alternative energy sources such as wind and solar cells have introduced a new variability to the grid, as they are not constant and vary with the time of the day and the weather. While energy storage for them is feasible, available storage methods (batteries, compressed air, etc.) have a cost of above 20 cents/kWh stored, a factor of 10 higher than the method and system described herein, and energy losses of 20-25%. Using the invention, the cost of the storage is less than 2 cents/kWh and the energy losses are less then 5%. For example, in a year, 7 hours of storage a day provide 2555 hours of stored electricity. If we apply a capital charge of 10% per year, this gives $40-42 per year or about 1.6 cents/kWh. Even at double the investment, this is still cheaper by a magnitude than other available storage methods.

There is therefore an increase in the demand for dispatchable energy. At present in the U.S. the contribution of wind and solar cells is small, but the use of energy from wind should increase. In Europe, its variability already causes significant control problems in the grid. The solar plant in Example 1, for example, can be modified to provide dispatchable energy by increasing the heat storage capacity by 86% (from 7 to 13 hours of storage, not using the power plant on a steady basis during the day, but only using it for load following), and increasing the steam power plant PP by any desired factor. If the steam power plant is increased by a factor of 4, up to 400 MWe of instantaneous power can be supplied for short periods, provided the total number of kWh does not exceed the maximum energy absorbed on the solar thermal collectors per day or, with even larger heat storage, per week. In fact, one can design the plant for any desired delivery schedule.

In Example 1, the steam power plant PP was increased by 50% in order to improve control over fluctuating needs and handle the higher solar insolation during the summer. However, the total daily output cannot exceed the total energy collected during the day, unless the heat storage is for multiple days. For a larger output over shorter periods, e.g., to provide 400 MWe temporarily, only the power plant PP needs to be increased by a factor of four. However, without enlarging the solar thermal collectors of the system CSTC and the heat storage tanks of the system HSS, the total output per day cannot exceed the maximum electric output that the solar thermal collectors allow. As the cost of the power plant PP is only 10 to 15% of the total investment, this is probably the cheapest way to assure that controllable electricity is constantly available to take care of large fluctuations.

The examples described herein demonstrate the feasibility and attractiveness of the energy storage system of the invention. The actual real-world configuration of the system strongly depends on local conditions, location, and desired delivery schedule (base load, intermediate or variable load). Furthermore, those skilled in the art will recognize that the ultimate design will also depend on how and where the equipment is manufactured and shipped. For example, prefabricated mass-produced vessels properly designed could reduce cost by a factor of two to three. The pressure can also be changed, with lower pressure resulting in a lower vessel cost, but higher compression requirements. The number of solar thermal collectors in a single train can of course be varied as it will depend on the requirements of the system; a larger number increases the pressure drops, but simplifies the design. By increasing the number of solar thermal collectors in a single train, one also increase the heat transfer coefficient and thereby the maximum feasible temperature at the outlet of the train, which improves the thermal efficiency of the plant.

The examples use parabolic solar thermal collectors because they are the only concentrating solar power plants presently operating on a large scale. The solar thermal collectors of the invention can thus be similar to those used in industry with a liquid heat transfer fluid, except that the liquid heat transfer fluid is replaced by a compressed gas in the way described herein. However, aspects of the invention can also be utilized with any other (existing, proposed, or otherwise) system or configuration for concentrating solar power plants, including those which use any heat transfer fluid, either liquid or gaseous.

The method can be used to improve the efficiency of CSP plants with any molten salt for storage as it eliminates the storage temperature penalty (>200° F.) or any Dowtherm in the collector tanks or trough systems, as those collectors could be modified to use $CO_2$ (or air but preferably $CO_2$).

One can also utilize aspects of the invention to any future design or system that can utilize a compressed gas as a heat transfer medium in the solar thermal collectors. The invention will have, for such cases, similar advantages when one replaces the heat transfer fluid with a compressed gas, making suitable design changes with regard to the storage and recovery the heat in the same way. For example, as they are designed at present, concentrating solar power plants using solar towers use a molten salt or, heat the working fluid of the plant (such as steam) directly with no storage. The invention can also utilize solar towers with even greater advantages than for the parabolic trough collectors, as the heat transfer medium no longer imposes any constraint on maximum operating temperature, i.e., the solar tower can utilize its advantage over the parabolic trough collector due to its ability to reach higher operating temperatures. The same applies to dish collectors used in Dish Stirling Systems as well as other systems using dish collectors.

At present CSP based on solar towers using molten salt as a storage medium are more expensive than trough plant and have a larger footprint (Sargent and Lundy). Storage with compressed $CO_2$ or air could reverse that as it would allow storage at higher temperatures thereby significantly increasing the efficiency of the steam power plant, thereby reducing the cost of the total system per kW capacity. Furthermore, collection and storage at 1700° F. would reduce storage cost by a factor of 1.8 compared to 1000° F. Not only that, such a solar tower design could be used to increase the thermal efficiency of existing CSP plants based on parabolic troughs by producing super heat for the power plant. As this has a much higher efficiency than using the heat for raising steam, this would provide a use for the tower with a significant cost advantage over a conventional trough plant and be used to improve existing trough plants, eliminating their disadvantage due to the temperature limitations of the present heat transfer fluid.

The advantage of high temperature could also enable design of solar towers specifically designed for 1700° F. instead of the 3000° F. in the present design. While such a design could have large cost advantages it is outside the patent, but the storage for it by compressed gas is part of the invention.

Compressed air has also been proposed as a heat transfer medium for solar towers to drive a combined cycle turbine. However, no storage is provided in the existing pilot plant or proposed designs. Such designs are also completely different than the invention. According to the invention, the compressed gas operates in a closed cycle, which strongly reduces compression costs. However, the invention can also be applied to such a gas turbine. In this case the collectors would provide heat for two circuits of compressed gas. One is fed by the compressor of the gas turbine feed, the other by compressed air at the same pressure in a closed circuit collecting the excess heat generated by the collectors and transferring it to the storage system similar to the one described before. To recover the stored heat when there is an insufficient sunshine the air compressed from the turbine feed is passed through the storage tank first and then expanded in the turbines.

Alternatively, a circuit can be utilized of compressed $CO_2$ or air absorbing all heat from the collectors and heat exchange it either with the compressed turbine feed or first transfer it to the heat storage systems and then recover it by compressed $CO_2$ and heat exchange it with the turbine feed, either directly or from the storage circuit, totally equivalent to the design of the steam power plant.

A further design would be similar to the last but would use a closed circuit of a suitable gas for the power cycle in the gas turbines that may have advantage over air.

The storage method of the invention can thus be applied to existing or proposed systems equally well in order to provide the necessary heat storage. However, combined cycle turbines can only be varied plus or minus 20%. On the other hand, they can be shut down and started up again in a short time. Therefore, they are useful for intermediate load conditions and for fixed periods of predictable high loads. However, combined cycle turbines are not useful for rapid load conditions following over wide ranges.

The invention also contemplates having a separate circulation for the heat storage and for collecting the heat in the collectors. In this case, the heat transfer medium in both circuits can be the same compressed gas, or one can use different fluids. With the collectors, there is a big advantage to having higher pressures, as it is possible to use more collectors in a single train. Also, increasing the pressure in the collector pipes results in only a small cost penalty, whereas the cost penalty of the heat storage tanks, above a certain pressure, is much larger. On the other hand, the penalty for lower pressures caused by increasing losses in the recompression of the heat transfer medium is much larger in the collector pipes than in the heat storage tanks. Thus, it might be advantageous, in some cases, to use two closed circuits; one for the heat collection at high pressure (30-50 atm. And preferably 40-100 atm. and one for the heat storage at lower pressure, and with heat transfer between the two circuits. One has to compare the savings in the cost of the heat storage tanks (atmospheric and not under pressure anymore) versus the cost of the heat exchanger between the two circuits. The final choice depends on cost considerations and in many cases may be the preferable method.

The use of any compressed gas as a heat transfer medium in solar thermal collectors can be utilized not only with the exemplified method of heat storage, which uses a solid filling, but also with any other method of heat storage such as those utilizing molten salt. In the latter case, when the heat is not needed in the power plant, the compressed gas can be heat exchanged either directly or via a heat exchanger with the molten salt or any other medium utilized for the heat storage. The potential advantage of using a heat exchanger is that the heat storage tanks do not need to be pressurized, and are therefore cheaper. Of course, for each case one has to weigh the savings in the vessels versus the cost of the heat exchanger system and the heat transfer medium.

There are, of course, many ways to implement this invention which can use a compressed gas, preferably air or $CO_2$, and most preferably $CO_2$. The pressure should be between 3-200 atmospheres, preferably between 10-100 atm, and most preferably between 20-50 atmospheres. A unique aspect of the invention relates to the use of a circulated compressed gas (e.g., air or $CO_2$) instead of a storable heat transfer fluid. Furthermore, the invention relates to novel way of designing heat storage tanks with a length long enough to allow the hot gas flowing through the heat storage vessel to create a relatively sharp front compared to the total length of the vessel, such that the hot end remains hot during heat recovery while the cold end remains at a low temperature during the heating cycle. As a result, exit temperatures during the heating and cooling of the heat storage vessels can remain constant. This is very important for the operation of the power plant because it ensures high thermal efficiency for the overall plant and allows rapid switching between cycles. However, as explained above, the use of a compressed gas in the collectors can also be used with other methods of heat storage. Another unique element that is a critical consideration for the invention is that the compressed gas is passed at high velocity through a large number of solar thermal collectors arranged in a train. This reduces the number of compressors needed, and simplifies the gas distribution configuration. As the higher velocity increases the heat transfer coefficient, it also reduces the temperature differential required between the receiver pipe and the heat transfer medium in the last solar thermal collector of the train. This improves the thermal efficiency. But the most important advantage of the invention is that it frees the system design from the constraints in temperature imposed by the liquid heat transfer fluid in the solar thermal collectors, which presently limits the maximum temperature in the solar thermal collector to below 800° F. (it could be higher if a molten salt is used in the collectors, but in that case the collectors have to be heat traced in order to prevent the molten salt from freezing). The heat transfer medium of the invention is preferably not only cheaper, but also non-flammable (although we recommend to use a non-flammable gas, a flammable gas or a mixture that contains a flammable gas could also be used if it provides advantages in terms of higher $C_P$, lower $C_P/C_V$ ratio, etc.), and provided it does not solidify at low temperatures. In the invention, the main constraint in maximum temperature is thus due to the design of the solar thermal collectors and the materials used.

The invention has several important advantages over the existing systems. Compared to the present high temperature heat transfer fluids used in the solar thermal collectors, with the invention there is little to no fire risk, and the maximum steam temperature is no longer constrained to below 800° F. Compared to molten salts, which would allow for a higher temperature, with the invention there is little to no danger of freezing or solidifying at night, and therefore no need for heat tracing. The invention, therefore, can reduce the overall costs of the system significantly.

The invention also allows for a large range of specific designs because it can utilize a cheaper and more reliable energy storage method and/or system.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

TABLE 1

| Parameter | Value |
|---|---|
| Solar Plant Size (MW) | 100 |
| Steam Power Plant Size (MW) | 150 |
| Heat Transfer Medium | Air or $CO_2$ |
| Pressure (atm) | 30 |
| $T_{Max}$ in Solar Thermal Collectors (° F.) | 1050 |
| Daily kWh generated/kW installed | 13 |
| Daily kWh Directly from Solar Insolation/kW Installed | 6 |
| Daily kWh via Storage/kW Installed | 7 |
| Average Daily Solar Insolation (kWh/m² day) | 7.5 |
| Power Plant Efficiency (%) | 40.1 |
| (1 kWh = 8500 Btu) | |
| Solar Thermal Collector Element (m²) | 22.7 |
| Aperture (m) × Length (m) | 5.7 × 4.0 |
| Receiver Pipe Diameter (m) | 0.07 |
| Total Number of Solar Thermal Collectors | 42,750 |
| Number of Solar Thermal Collectors in a Train | 25 |

TABLE 2

| Parameter | Value |
|---|---|
| Heat Storage: Number of Vessels | 45 |
| (Diameter × Length: ft × ft) | (12 × 60) |
| Total Vessels Volume (ft³) | 300,000 |
| (including 50% to stabilize the ends and for the higher summer insolation compared to the design value) | (20,500 tons) |
| Solid Filling | 10 mm Average Diameter Alumina Particles |
| Density (lb/ft³) | 250 |
| Bulk Density (lb/ft³) | 150 |

TABLE 3a

Pressure Drops, Compression Energy Required, and $\Delta T_{ave}$ (30 atm, 25-solar thermal collector train)

| | Value | |
|---|---|---|
| Parameter | Air | $CO_2$ |
| Flow Rate in Solar Thermal Collectors (ft³/sec) | 2,490 | 1,580 |
| Flow Rate in Heat Storage Tanks (ft³/sec) | 1,100 | 700 |
| Velocity in Solar Thermal Collectors (ft/sec) | 35 | 22 |
| Velocity in Heat Storage Tanks (ft/sec) | 0.27 | 0.17 |
| Pressure Drops in Solar Thermal Collectors (atm) | 0.18 | 0.104 |
| Pressure Drops in Total Piping System (atm) | 0.25 | 0.15 |
| Total Pressure Drops in Heat Storage Tank (atm) | 0.05 | 0.026 |
| Single Pass Pressure Drops in Heat Storage Tank (atm) | 0.025 | 0.013 |
| Pressure Drops in Distributors (atm) | 0.02 | 0.01 |
| Total Pressure Drops without Storage (atm) | 0.43 | 0.254 |
| Total Pressure Drops with Storage (atm) | 0.5 | 0.29 |
| kWh Compression per kWh Generated without Storage | 0.012 | 0.0045 |

TABLE 3a-continued

Pressure Drops, Compression Energy Required, and
$\Delta T_{ave}$ (30 atm, 25-solar thermal collector train)

| Parameter | Value Air | Value $CO_2$ |
|---|---|---|
| kWh Compression per kWh Generated with Storage | 0.014 | 0.005 |
| $\Delta T_{ave}$ between the Temperatures of the Receiver Pipe and the Gas Entering and Exiting the Last Solar Thermal Collector of the Train (° F.) | 54 | 54 |

TABLE 3b

Pressure Drops, Compression Energy Required, and
$\Delta T_{ave}$ (30 atm, 50-solar thermal collector train)

| Parameter | Value Air | Value $CO_2$ |
|---|---|---|
| Total Pressure Drops without Storage (atm) | 1.53 | 0.94 |
| Total Pressure Drops with Storage (atm) | 1.6 | 0.976 |
| kWh Compression per kWh Generated without Storage | 0.044 | 0.017 |
| kWh Compression per kWh Generated with Storage | 0.047 | 0.018 |
| $\Delta T_{ave}$ between the Temperatures of the Receiver Pipe and the Gas Entering and Exiting the Last Solar Thermal Collector of the Train (° F.) | 32 | 32 |

TABLE 3c

Pressure Drops Compression Energy Required, and $\Delta T_{ave}$
when Average Daily Solar Insolation = 6.0 kWh/m² day (30 atm, 25-solar thermal collector train)

| Parameter | Value Air | Value $CO_2$ |
|---|---|---|
| Total Pressure Drops without Storage (atm) | 0.27 | 0.176 |
| Total Pressure Drops with Storage (atm) | 0.32 | 0.2 |
| kWh Compression per kWh Generated without Storage | 0.0076 | 0.0031 |
| kWh Compression per kWh Generated with Storage | 0.009 | 0.0035 |
| $\Delta T_{ave}$ between the Temperatures of the Receiver Pipe and the Gas Entering and Exiting the Last Solar Thermal Collector of the Train (° F.) | 49 | 51 |

TABLE 3d

Pressure Drops Compression Energy Required, and $\Delta T_{ave}$
when Average Daily Solar Insolation = 9.0 kWh/m² day (30 atm, 25-solar thermal collector train)

| Parameter | Value Air | Value $CO_2$ |
|---|---|---|
| Total Pressure Drops without Storage (atm) | 0.54 | 0.347 |
| Total Pressure Drops with Storage (atm) | 0.64 | 0.41 |
| kWh Compression per kWh Generated without Storage | 0.015 | 0.0062 |
| kWh Compression per kWh Generated with Storage | 0.018 | 0.0073 |
| $\Delta T_{ave}$ between the Temperatures of the Receiver Pipe and the Gas Entering and Exiting the Last Solar Thermal Collector of the Train (° F.) | 59 | 57 |

TABLE 4a

Pressure Drops, Compression Energy Required, and
$\Delta T_{ave}$ (3 atm, 10-solar thermal collector train)

| Parameter | Value Air | Value $CO_2$ |
|---|---|---|
| Total Pressure Drops without Storage (atm) | 0.45 | 0.34 |
| Total Pressure Drops with Storage (atm) | 1.15 | 0.76 |
| kWh Compression per kWh Generated without Storage | 0.14 | 0.064 |
| kWh Compression per kWh Generated with Storage | 0.437 | 0.159 |
| $\Delta T_{ave}$ between the Temperatures of the Receiver Pipe and the Gas Entering and Exiting the Last Solar Thermal Collector of the Train (° F.) | 104 | 105 |

TABLE 4b

Pressure Drops, Compression Energy Required, and
$\Delta T_{ave}$ (10 atm, 25-solar thermal collector train)

| Parameter | Value Air | Value $CO_2$ |
|---|---|---|
| Total Pressure Drops without Storage (atm) | 0.96 | 0.62 |
| Total Pressure Drops with Storage (atm) | 1.17 | 0.75 |
| kWh Compression per kWh Generated without Storage | 0.086 | 0.034 |
| kWh Compression per kWh Generated with Storage | 0.107 | 0.042 |
| $\Delta T_{ave}$ between the Temperatures of the Receiver Pipe and the Gas Entering and Exiting the Last Solar Thermal Collector of the Train (° F.) | 54 | 54 |

What is claimed:

1. A process for storing and retrieving thermal energy using a heat transfer fluid in a heat storage system, the process comprising the steps of:
   (a) providing a flow path in a heat storage tank, said flow path for connection to a source of pressurized gas heat transfer fluid, said flow path having input and output ports for the flow of said heat transfer fluid;
   (b) loading said flow path with a storage medium comprising high temperature high thermal conductivity heat resistant solids having high heat transfer coefficient for interaction with a flow of said heat transfer fluid, said solids being in intimate contact with each other and forming a packed bed, said solids being shaped for low-pressure drop in said fluid flow, and said solids having a contour for reducing contact between said solids wherein the surface area of said solids in said bed is exposed predominantly for direct contact with said fluid flow;
   (c) receiving at one said input port a flow of said pressurized gas heat transfer fluid from said source at or near said high temperature, said heated fluid flow heating at least a selection of said solids to at or near said high temperature as said heated fluid flows in a first flow direction along said flow path in contact with said selection of solids, wherein said heated fluid is flowed at a rate selected to create a sharp front as said flowing heated fluid heats said selection of solids to at or neat said high temperature, wherein the residence time of said flowing heated fluid as it travels from one said input port to one said output port is long compared to the time required for said heating of said selection of solids, for defining said sharp front; and (d) directing a cooler flow of said heat transfer fluid in a flow direction in said flow path countercurrent to said first flow direction and at a temperature below said high temperature for thermal energy recovery, said heated selection of solids heating said cooler countercurrent flow to at or near said high temperature, said flow path presenting said heated countercurrent flow of fluid at or near said high temperature at one said output port for use in a system needing thermal energy.

2. The process of claim 1, wherein the heat transfer fluid is a compressed gas and the system needing thermal energy is a power generating device and the fluid is recycled from the power generating device back to a heat source and/or back to the heat storage system.

3. The process of claim 1, wherein the heat source comprises solar collectors selected from parabolic troughs, solar towers, solar dishes, and combinations thereof 4. The process of claim 1, wherein said solids comprise alumina balls sized between about 5 mm and about 20 mm.

5. The process of claim 1, wherein the heat transfer fluid is a gas and has at least one property selected from the group comprising, non-flammable, inertness, high specific heat, and low Cp/Cv ratio.

6. The process of claim 1, wherein the heat transfer fluid is a gas selected from the group comprised of non-flammable compressed gases including air, carbon dioxide, and mixtures thereof, and superheated steam.

7. The process of claim 1, wherein the heat transfer fluid is a compressed gas pressurized in a range from about 2 atm to about 150 atm.

8. The process of claim 1, wherein the heat transfer fluid is a compressed gas at about 5 to about 60 atm.

9. The process of claim 1, wherein said front comprises a relatively narrow front extending about one tenth of the length of the storage tank.

10. The process of claim 1, wherein the inside of the storage tank comprises a refractory coating.

11. The process of claim 1, wherein the heat resistant solids are selected from alumina, silica, quartz, ceramic, and combinations thereof.

12. The process of claim 1, wherein the flow path for the fluid is closed and wherein the storage tank receives the heated fluid via a first end and the heated fluid flows through the storage medium from the first end toward a second end, wherein the flow rate of the heated fluid is adjusted to heat at least a portion of the storage medium at the first end to said at or about a selected high temperature.

13. The process of claim 12, wherein the countercurrent flow of the fluid at a temperature below said at or about a selected high temperature is flowed into the tank at the second end and after being heated exits from the first end at about said at or near a selected high temperature.

14. The process of claim 1, wherein the heat storage system operates at a temperature selected in the range of between 1700° F. to 2000° F.

15. The process of claim 1, wherein the heat transfer fluid heats a working fluid in a power generating device.

16. The process of claim 1, wherein the system needing thermal energy is a power generating device and includes a subsystem selected from the group comprising a steam power plant and a gas turbine.

17. The process of claim 1, wherein the system needing thermal energy is a power generating device and wherein the heat transfer fluid flows according to at least one circuit selected from the group including:
(a) Circuit 1, wherein the heat transfer fluid flows from the heat source to the power generating device and back to the heat source, bypassing the heat storage system;
(b) Circuit 2, wherein the heat transfer fluid flows from the heat source to the heat storage system and back to the heat source; and
(c) Circuit 3, wherein the heat transfer fluid flows from the heat storage system to the power generating device and back to the heat storage system.

18. The process of claim 1, wherein the heat storage system comprises a flow controller to flow the heat transfer fluid through the storage tank at a rate that defines a relatively sharp front.

19. The process of claim 1, wherein said process cycles between heat storing, storage, and heat recovery, and during said process a first end of said storage tank is hot and a second end is cool, wherein said heat storage tank has a flow path length long enough to allow said heated fluid flow to create said sharp front while heating said storage medium to at or near said high temperature at said hot end, wherein said front has a length that is relatively short compared to the total length of said flow path, and wherein said cool end remains cool at the end of said heat storage cycle and wherein said hot end remains hot up to the end of said heat recovery cycle.

20. A system for storing and retrieving thermal energy using a heat transfer fluid, the system comprising:
(a) a heat storage tank, a flow path defined in said tank for connection to a source of pressurized gas heat transfer fluid, said flow path having input and output ports for the flow of said heat transfer fluid;
(b) said flow path having a storage medium comprising high temperature high thermal conductivity heat resistant solids having high heat transfer coefficient for interaction with a flow of said heat transfer fluid, said solids being in intimate contact with each other and forming a packed bed, said solids being shaped for low-pressure drop in said fluid flow, said solids having a contour for reducing contact between said solids wherein the surface area of said solids in said bed is exposed predominantly for direct contact with said fluid flow;
(c) one said input port for receiving a flow of said pressurized gas heat transfer fluid from said source at or near said high temperature in said flow path for heating at least a selection of said solids to at or near said high temperature as said heated fluid flows in a first flow direction along said flow path in contact with said selection of solids; and
(d) a mechanism for flowing said heated fluid at a rate to create a sharp front as said flowing heated fluid heats said selection of solids to at or neat said high temperature, wherein said mechanism defines said sharp front by controlling the residence time of said flowing heated fluid as it travels from said input to output ports to be long compared to the time required for said heating of said selection of solids, and wherein said mechanism directs a cooler flow of said heat transfer fluid in a flow direction in said flow path countercurrent to said first flow direction and at a temperature below said high temperature for thermal energy recovery, said heated selection of solids heating said cooler countercurrent flow to at or near said high temperature, said flow path presenting said heated countercurrent flow of fluid at or near said high temperature at one said output port for use in a system needing thermal energy.

21. The system of claim 20, wherein said front is a relatively sharp front and extends about one tenth of the length of the storage tank.

22. The system of claim 20, wherein said arrangement needing thermal energy is a power plant.

23. The system of claim 22, wherein said arrangement needing thermal energy is a power turbine in a solar power plant.

24. The system of claim 20, wherein the heat transfer fluid is a gas and has at least one property selected from the group comprising, non-flammable, inertness, high specific heat, and low Cp/Cv ratio.

25. The system of claim 24, wherein the heat transfer fluid is a compressed gas selected from the group comprised of air, carbon dioxide, and mixtures thereof, and superheated steam.

26. The system of claim 25, wherein said solids are selected from alumina, silica, quartz, ceramic, and combinations thereof.

27. The system of claim 25, wherein said solids comprise alumina balls sized between about 5 mm and about 20 mm diameter.

28. The system of claim 22, wherein the inside of the storage tank comprises a refractory coating.

* * * * *

UNITED STATES PATENT AND TRADEMARK OFFICE
CERTIFICATE OF CORRECTION

PATENT NO. : 7,954,321 B2  
APPLICATION NO. : 12/066054  
DATED : June 7, 2011  
INVENTOR(S) : Reuel Shinnar Page 1 of 1

It is certified that error appears in the above-identified patent and that said Letters Patent is hereby corrected as shown below:

Cover page, column 2 (Other Publications), line 2, delete "Paper entitled Solar thermal energy: The forgotten energy source, by R. Shinnar et al., Technology in Society 29, pp. 261-270 (2007)." insert on line 3, --Paper entitled Solar thermal energy: The forgotten energy source, by R. Shinnar et al., Technology in Society 29, pp. 261-270 (2007).--.

Column 25, line 4 in claim 1, delete "neat" and insert --near--, therefore.

Column 25, line 27 in claim 3, delete "thereof" and insert --thereof.--, therefore.

Column 25, line 42 in claim 8, after "5" insert --atm--.

Column 26, line 58 in claim 20, delete "neat" and insert --near--, therefore.

Signed and Sealed this  
Ninth Day of August, 2011

David J. Kappos  
*Director of the United States Patent and Trademark Office*